(12) United States Patent
Lescoche

(10) Patent No.: US 6,835,310 B2
(45) Date of Patent: Dec. 28, 2004

(54) DEVICE FOR COUPLING TOGETHER A TUBE AND A FILTER HOUSING

(75) Inventor: Philippe Lescoche, Faucon (FR)

(73) Assignee: Technologies Avancees & Membranes Industrielles, Nyons (FR)

(*) Notice: Subject to any disclaimer, the term of this patent is extended or adjusted under 35 U.S.C. 154(b) by 0 days.

(21) Appl. No.: 10/731,160

(22) Filed: Dec. 10, 2003

(65) Prior Publication Data

US 2004/0112820 A1 Jun. 17, 2004

Related U.S. Application Data

(63) Continuation of application No. PCT/FR03/00900, filed on Mar. 21, 2003.

(30) Foreign Application Priority Data

Apr. 2, 2002 (FR) .............................................. 02 04084

(51) Int. Cl.[7] .......................... B01D 65/00; B01D 63/06; F16L 21/00; F16L 23/00
(52) U.S. Cl. ............... 210/232; 210/195.1; 210/321.79; 210/321.8; 285/1; 285/2; 285/95; 285/120.1; 285/123.1; 285/124.1; 285/328
(58) Field of Search ................................ 210/195.1, 232, 210/321.79, 321.8; 285/1, 2, 95, 120.1, 123.1, 124.1, 328

(56) References Cited

U.S. PATENT DOCUMENTS 4,108,775 A * 8/1978 Wilkes et al. ............... 210/169
4,869,820 A * 9/1989 Yee ............................. 210/316
6,592,152 B1 * 7/2003 Nejigaki et al. ........ 285/148.23

FOREIGN PATENT DOCUMENTS

| DE | 2819254 | 11/1978 |
|---|---|---|
| DE | 3842436 | 6/1990 |
| EP | 08326969 | 12/1996 |
| EP | 1078679 | 2/2001 |
| EP | 2001137671 | 5/2001 |
| EP | 2002054425 | 2/2002 |

* cited by examiner

Primary Examiner—John Kim
(74) Attorney, Agent, or Firm—Clark & Brody

(57) ABSTRACT

The invention relates to a device for using various types of coupling system to connect together a tube (2) and a filter housing (3). According to the invention, the device comprises:

a head plate (21) independent of the type of coupling system, the head plate being fixed to the housing (3) and being provided with passages (22) opening out into a bearing face (23) of the head plate;

for each backing-plate ($P_i$) of given type, a first bearing face (25) complementary to the bearing face (23) of the head plate (21) and a second bearing face (29) adapted to co-operate with a flange ($B_1$) of corresponding type;

a sealing gasket (28) interposed between the first bearing face (25) of a backing-plate ($P_i$) of a given type and the head plate (21); and releasable connection means (30) between the head plate (21) and each backing-plate ($P_1$) of a given type in order to provide sealing between them.

17 Claims, 2 Drawing Sheets

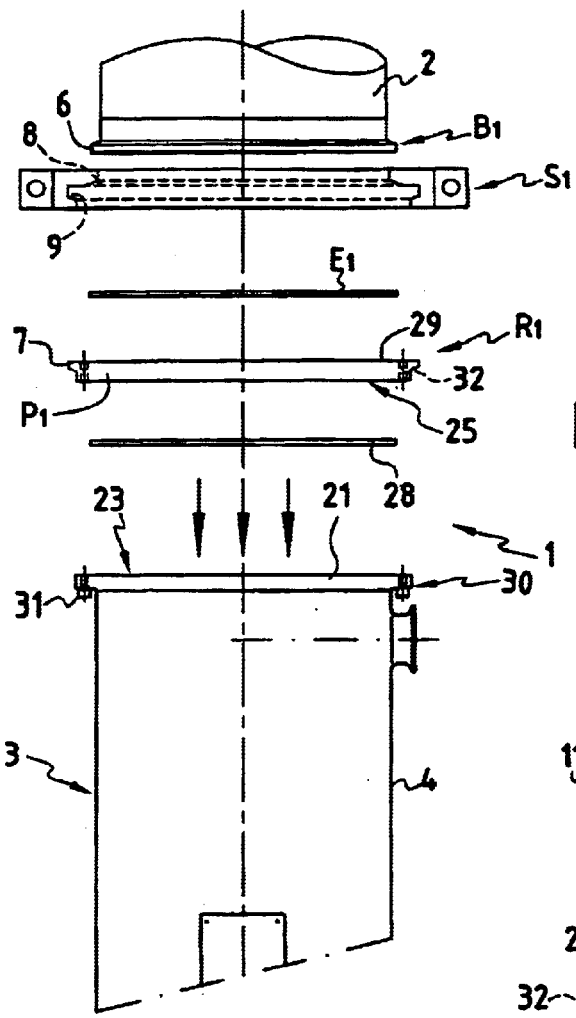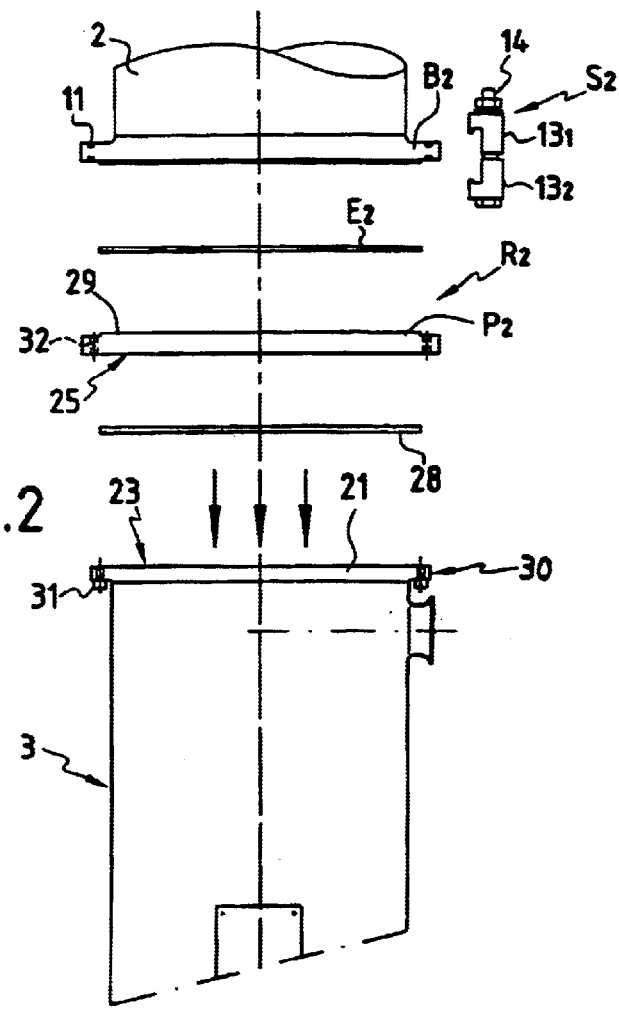

DEVICE FOR COUPLING TOGETHER A TUBE AND A FILTER HOUSING

This application is a continuation of International Patent Application No. PCT/FR03/00900, filed Mar. 21, 2003. This PCT application was not in English as published under PCT Article 21(2).

BACKGROUND OF THE INVENTION

The present invention relates to the technical field of separating molecules or particles by using separator elements, generally referred to as "membranes", adapted to separate molecules or particles contained in a fluid medium for treatment.

The subject matter of the invention finds a particularly advantageous application in the field of filtering (in the general sense) a fluid medium for treatment, and in particular in the fields of nanofiltration, ultrafiltration, microfiltration, etc.

In conventional manner, a filter installation has a circuit for circulating the fluid to be treated, said circuit being constituted by pipes, ducts, or more generally tubes, with at least one filter housing being inserted therein, the housing comprising a metal case having disposed therein tubular filter elements that extend parallel to one another. Each filter element has at least one flow channel for the fluid to be treated. The filter elements perform cross-flow filtering of the fluid to be treated in order to obtain a filtrate at the peripheral surfaces of the filter elements, which filtrate is recovered in a collection chamber arranged outside the housing.

In traditional manner, the filter housing is connected at each of its ends to a tube via a coupling system, that is of a type that depends on the application.

Thus, a first known type of coupling system is referred to as a "clamp" type and is in very widespread use in the food industry. Such a system comprises:

- a clamp type flange provided with a tightening cone and mounted on the tube to be connected;
- a backing-plate of the clamp type likewise provided with a tightening cone and mounted on the filter housing;
- a sealing gasket interposed between said flange and said backing-plate; and
- tightening means of the clamp type constituted by a collar which is fitted over the tightening cones of the flange and the backing-plate in order to compress the gasket and consequently provide sealing between the tube and the filter housing.

A second type of coupling system is also known that is referred to as a gripper type system and is used in particular in the farm-produce industry, that is less expensive than the clamp type coupling system, in particular, since it does not require clamping cones to be provided.

Such a gripper coupling system comprises:

- a gripper type flange provided with a peripheral groove and fitted to the tube for coupling;
- a backing-plate of the gripper type likewise provided with a peripheral groove and mounted on the filter housing;
- a sealing member interposed between said flange and said backing-plate; and
- gripper type tightening means distributed around said flange and said backing-plate in order to pinch the sealing member.

A third type of coupling system is also known, that is referred to as a flange type system which is used in particular in the field of chemistry. Such a coupling system comprises:

- a flange mounted on the tube to be connected;
- a backing-plate mounted on the filter housing;
- a flat gasket interposed between said flange and said backing-plate; and
- flange type fasteners constituted by nuts and bolts acting between the flange and the backing-plate in order to compress the gasket and consequently provide sealing.

It should be observed that it is necessary to have as many types of housing as there are types of coupling system. The Applicant has felt the need to have a filter housing of universal nature, capable of being made independently of the coupling system that is used.

BRIEF SUMMARY OF THE INVENTION

The present invention thus seeks to satisfy this requirement by proposing a device enabling a tube to be connected to a filter housing using the various known types of coupling system, while implementing a universal type filter housing capable of being coupled to a tube using the various types of coupling system.

The subject matter of the invention thus seeks to achieve such an object and relates to a device for using various types of coupling system to connect a tube to a filter housing including a series of tubular filter elements, each coupling system of a given type comprising:

- a flange of said type fitted to the tube;
- a backing-plate of said type for connection to the filter housing;
- a sealing member interposed between said flange and said backing-plate; and
- tightening means of said type acting between said flange and said backing-plate in order to provide sealing between them.

According to the invention, the device comprises:

- a head plate independent of the type of coupling system fixed to the housing and provided with passages for receiving the ends of the tubular filter elements, these passages opening out in a bearing face of the head plate;
- for each backing-plate of a given type, a first bearing face complementary to the bearing face of the head plate, and a second bearing face adapted to co-operate with the flange of corresponding type;
- a sealing gasket interposed between the first bearing face of a backing-plate of a given type and the head plate; and
- releasable connection means between the head plate and each backing-plate of a given type to provide sealing between them and to enable each backing-plate of a given type to be mounted on and removed from the head plate.

In a first variant embodiment, the backing-plate of a given type forms part of a clamp type coupling system.

In a second variant embodiment, the backing-plate of a given type forms part of a gripper type coupling system.

In a third variant embodiment, the backing-plate of a given type forms part of a flange type coupling system.

Other embodiments appear in the description below made with reference to the accompanying drawings which show embodiments and implementations of the subject matter of the invention by way of non-limiting examples.

BRIEF DESCRIPTION OF THE DRAWINGS

FIG. 1 is an exploded view of a connection device in accordance with the invention implementing a clamp type coupling system.

FIG. 2 is an exploded view of a connection device in accordance with the invention implementing a gripper type coupling system.

Figure 3:
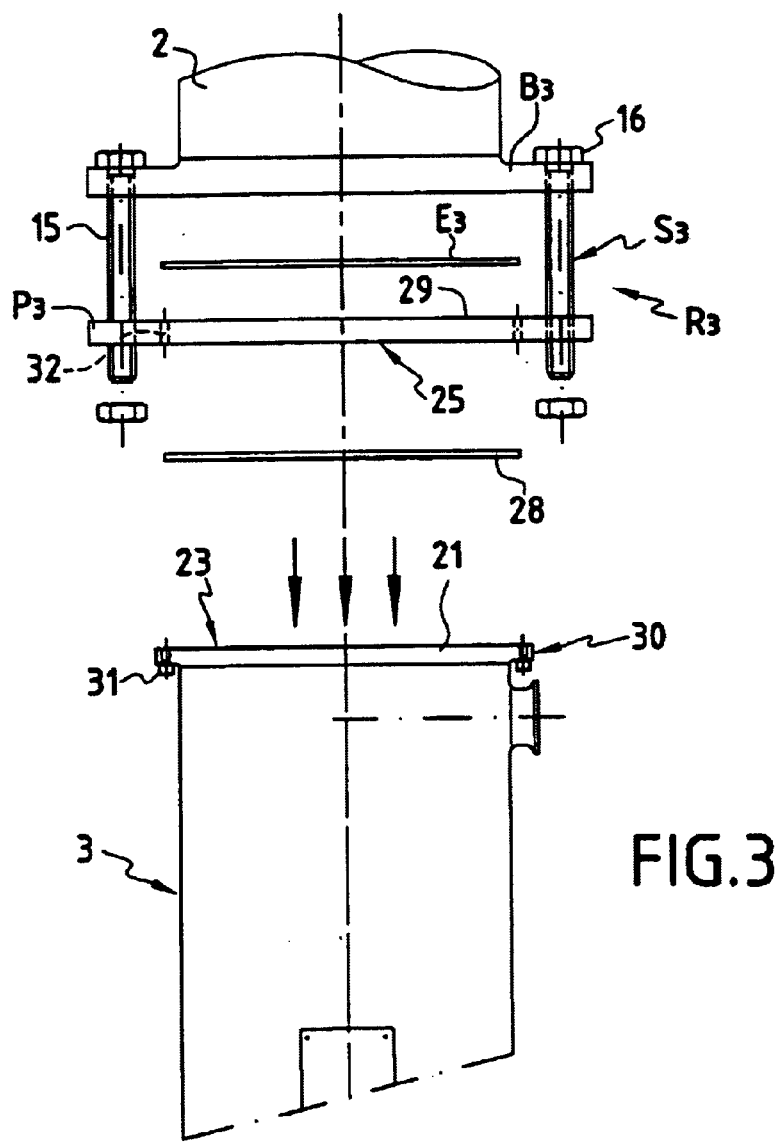
FIG. 3 is an exploded view of a connection device in accordance with the invention implementing a flange type coupling system.

The subject matter of the invention relates to a device 1 for using various types of coupling systems $R_i$ to connect together a pipe, a duct, or in general terms a "tube" 2 forming part of a filter installation, and a filter system commonly referred to as a filter housing 3. In conventional manner, the filter housing 3 is constituted by a metal case 4 of generally tubular shape having mounted therein filter elements that are of generally tubular shape, not shown, but known in themselves.

The description below relates to three types of coupling system $R_i$ referenced $R_1$, $R_2$, and $R_3$, however it is clear that the subject matter of the invention can be implemented using other types of coupling system. It should be observed that for reasons of clarity, all of the component elements of a coupling system $R_i$ are given the index i.

DETAILED DESCRIPTION OF THE INVENTION

FIG. 1 shows a first coupling system $R_1$ which is of the clamp type. Such a system $R_1$ comprises a flange $B_1$ of the clamp type fitted to the tube 2. The flange $B_1$ of the clamp type is provided with a tightening cone 6 whose function appears more clearly from the description below. The clamp-type coupling system $R_1$ also comprises a backing-plate $P_1$ of the clamp type for connection to the filter housing 3. This backing-plate $P_1$ of the clamp type is provided with a tightening cone 7 whose function appears more clearly from the description below. A sealing member $E_1$ such as a clamp-type gasket is interposed between said backing-plate $P_1$ and said flange $B_1$. The clamp-type coupling system $R_1$ also comprises tightening means $S_1$ of the clamp type acting between the flange $B_1$ and the backing-plate $P_1$ to provide sealing between them. These tightening means $S_1$ are constituted by a clamping collar arranged with recesses 8 and 9 that are complementary to the cones 6 and 7 respectively so that the gasket $E_1$ interposed between the transverse faces of the flange $B_1$ and the backing-plate $P_1$ deform to provide sealing between them.

FIG. 2 shows a second coupling system $R_2$ of the gripper type. Such a gripper coupling system $R_2$ comprises a flange $B_2$ of the gripper type fitted to the tube 2. The gripper type flange $B_2$ is provided with a peripheral groove 11 whose function is described in greater detail below. The gripper-type coupling system $R_2$ also has a backing-plate $P_2$ of the gripper type for connection to the filter housing 3.

A sealing member $E_2$ such as a clamp-type gasket is interposed between said backing-plate $P_2$ and said flange $B_2$. The coupling system $R_2$ also has tightening means of the gripper type $S_2$ acting between the flange $B_2$ and the backing-plate $P_2$ to provide sealing between them. These tightening means $S_2$ are constituted by a series of grippers each constituted by two jaws 131, 132 driven in relative displacement by means of a screw 14. One of the jaws of a gripper is engaged in the groove 11 of the flange $B_2$ while the other jaw acts on the backing-plate $P_2$.

FIG. 3 shows a third coupling system $R_3$ of the flange type. Such a coupling system $R_3$ comprises a flange $B_3$ of the fitted to the tube 2. Such a coupling system $R_3$ also comprises a backing-plate $P_3$ of the flange type designed to be connected to the filter housing 3. A sealing member $E_3$ such as a flat gasket is interposed between said backing-plate $P_3$ and said flange $B_3$.

The flange-type coupling system $R_3$ also comprises tightening means $S_3$ of the fastener type acting between said flange $B_3$ and said backing-plate $P_3$ to provide sealing between them. These tightening means $S_3$ are constituted, by way of example, by a series of bolts 15 engaged in holes formed in the periphery of the backing-plate $P_3$ and the flange $B_3$ so as to co-operate with nuts 16.

The various coupling systems $R_i$, i.e. $R_1$, $R_2$, and $R_3$ in the examples given above are not described in greater detail insofar as they are well known in the art.

In accordance with the invention, the connection device 1 is adapted to connect a tube 2 to the housing 3 using any one of the coupling systems $R_i$. In other words, the filter housing 3 of the invention can be connected to the tube 2 equally well by any one of the coupling systems $R_i$. For this purpose, the filter housing 3 is provided with a head plate 21 that is independent of the type of coupling system $R_i$. When the filter housing 3 is designed to be connected at both ends to a respective tube 2, each end of the filter housing 3 is provided with such a head plate 21.

Figure 4:
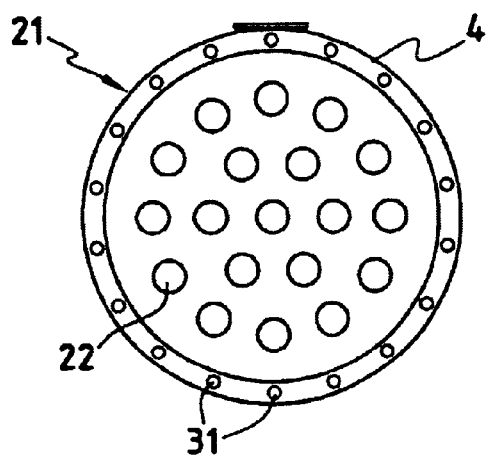
FIG. 4 is an end view of a head plate in accordance with the invention.

As can be seen more clearly in FIG. 4, each head plate 21 is provided with passages 22 for receiving one end of a respective tubular filter element. In the example shown, each of the passages 22 possesses a right cross-section that is circular and each of them is designed to receive a sealing ring. Each of the passages 22 passes through the head plate 21 so as to open out in a bearing face 23 of the head plate 21. This bearing face 23 is thus on the outside relative to the filter housing 3.

According to a characteristic of the invention, each backing-plate $P_i$ presents a first bearing face 25 complementary to the bearing face 23 of the head plate 21 so that interposing a gasket 28 between them can enable sealing to be obtained between the head plate 21 and the backing-plate $P_i$. In other words, the bearing faces 23 and 25 are complementary in the sense that co-operation between them via a gasket enables a leaktight assembly to be obtained. Each backing-plate $P_i$ also has a second bearing face 29 opposite from its first bearing face and adapted to co-operate with the flange $B_i$ of corresponding type. In other words, the second bearing face 29 possesses known characteristics in order to match the corresponding flange $B_i$ and obtain sealing. Naturally, each backing-plate $P_i$ of a given type includes a series of holes (not shown) each arranged to coincide with one of the passages 22 for receiving the ends of the tubular filter elements so as to allow the fluid that is to be treated to pass.

The connection device 1 of the invention also has dismountable connection means 30 between the head plate 21 and each backing-plate $P_i$ in order to provide sealing between them and in order to allow each backing-plate $P_i$ to be mounted on or removed from the head plate 21. These releasable connection means 30 are constituted by screws, flanges, grippers, or the like co-operating with the head plate 21 and any one of the backing-plates $P_i$. In the example shown, the releasable connection means 30 are constituted by screws 31 distributed around the periphery of the head plate 21 and designed to be screwed into tapped holes 32 formed in each backing-plate $P_i$.

It should therefore be understood that the filter housing 3 of the invention can be fitted equally well with any one of the known coupling systems $R_i$. The backing-plate $P_i$ of each coupling system $R_i$ is suitable for being mounted on the head plate 21 of the filter housing 3 by the releasable connection means 30.

According to a preferred implementation characteristic, the tightening means $S_1$ of the clamp type are constituted by an asymmetrical clamping collar enabling a tube 2 to be connected having a diameter that is different from the diameter of the filter housing 3. For this purpose, the tightening cones 6, 7 and consequently the recesses 8, 9 in the collar are of different diameters, as can be seen clearly in FIG. 1.

What is claimed is:

1. A device for using various types of coupling system ($R_1$) to connect a tube (2) to a filter housing (3) including a series of tubular filter elements, each coupling system ($R_1$) of a given type comprising:
    a flange ($B_1$) of said type fitted to the tube (2);
    a backing-plate ($P_1$) of said type for connection to the filter housing;
    a sealing member ($E_1$) interposed between said flange ($B_1$) and said backing-plate ($P_1$); and
    tightening means ($S_1$) of said type acting between said flange and said backing-plate in order to provide sealing between them, the device being characterized in that it comprises:
        a head plate (21) independent of the type of coupling system ($R_1$) fixed to the housing (3) and provided with passages (22) for receiving the ends of the tubular filter elements, these passages (22) opening out in a bearing face (23) of the head plate;
        for each backing-plate ($P_1$) of a given type, a first bearing face (25) complementary to the bearing face (23) of the head plate (21), and a second bearing face (29) adapted to co-operate with the flange ($B_1$) of corresponding type;
        a sealing gasket (28) interposed between the first bearing face (25) of a backing-plate ($P_1$) of a given type and the head plate (21); and
        releasable connection means (30) between the head plate (21) and each backing-plate ($P_1$) of a given type to provide sealing between them and to enable each backing-plate ($P_1$) of a given type to be mounted on and removed from the head plate (21).

2. A device according to claim 1, characterized in a backing-plate ($P_1$) of a given type forms part of a clamp type coupling system ($R_1$).

3. A device according to claim 1, characterized in that a backing-plate ($P_2$) of a given type forms part of a gripper type coupling system ($R_2$).

4. A device according to claim 1, characterized in that a backing-plate ($P_3$) of a given type forms part of a flange type coupling system ($R_4$).

5. A device according to claim 1, characterized in that each backing-plate ($P_1$) of a given type has a series of holes each arranged to coincide with the passages (22) receiving the ends of the tubular filter elements.

6. A device according to claim 1, characterized in that the releasable connection means (30) are constituted by screws, clamps, grippers, or the like co-operating with the head plate (21) and each backing-plate ($P_1$) of a given type.

7. A device according to claim 2, characterized in that the backing-plate ($P_1$) of the clamp type co-operates with a flange ($B_1$) of the clamp type via tightening means ($S_1$) constituted by an asymmetrical clamping collar enabling a tube (2) of one diameter to be connected to a filter housing (3) of a different diameter.

8. A filter installation including a tube (2) connected to a filter housing (3) by means of a connection device (1) according to claim 1.

9. A device according to claim 2, characterized in that each backing-plate ($P_1$) of a given type has a series of holes each arranged to coincide with the passages (22) receiving the ends of the tubular filter elements.

10. A device according to claim 3, characterized in that each backing-plate ($P_1$) of a given type has a series of holes each arranged to coincide with the passages (22) receiving the ends of the tubular filter elements.

11. A device according to claim 4, characterized in that each backing-plate ($P_1$) of a given type has a series of holes each arranged to coincide with the passages (22) receiving the ends of the tubular filter elements.

12. A filter installation including a tube (2) connected to a filter housing (3) by means of a connection device (1) according to claim 2.

13. A filter installation including a tube (2) connected to a filter housing (3) by means of a connection device (1) according to claim 3.

14. A filter installation including a tube (2) connected to a filter housing (3) by means of a connection device (1) according to claim 4.

15. A filter installation including a tube (2) connected to a filter housing (3) by means of a connection device (1) according to claim 5.

16. A filter installation including a tube (2) connected to a filter housing (3) by means of a connection device (1) according to claim 6.

17. A filter installation including a tube (2) connected to a filter housing (3) by means of a connection device (1) according to claim 7.

* * * * *